United States Patent
Kumar (10) Patent No.: US 7,257,580 B2
(45) Date of Patent: Aug. 14, 2007

(54) METHOD, SYSTEM, AND PROGRAM FOR RESTRICTING MODIFICATIONS TO ALLOCATIONS OF COMPUTATIONAL RESOURCES

(75) Inventor: Saji C. Kumar, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/786,347

(22) Filed: Feb. 24, 2004

(65) Prior Publication Data
US 2005/0187935 A1   Aug. 25, 2005

(51) Int. Cl.
G06F 7/00   (2006.01)
G06F 17/30  (2006.01)
G06F 17/00  (2006.01)
G06F 7/04   (2006.01)
G06K 9/00   (2006.01)
H03M 1/68   (2006.01)
H04K 1/00   (2006.01)
H04L 9/00   (2006.01)
H04L 9/32   (2006.01)
H04N 7/16   (2006.01)

(52) U.S. Cl. .......................... 707/9; 707/101; 707/102; 726/26

(58) Field of Classification Search .................... 707/9, 707/10, 1; 714/48; 718/104, 105; 726/14, 726/19; 713/200
See application file for complete search history.

(56) References Cited

U.S. PATENT DOCUMENTS

| 5,261,102 | A | 11/1993 | Hoffman | 726/19 |
|---|---|---|---|---|
| 6,202,066 | B1* | 3/2001 | Barkley et al. | 707/9 |
| 6,212,511 | B1 | 4/2001 | Fisher et al. | 707/1 |
| 6,611,834 | B1 | 8/2003 | Aggarwal et al. | 707/10 |
| 7,185,192 | B1* | 2/2007 | Kahn | 713/155 |
| 2002/0169781 | A1* | 11/2002 | Poole et al. | 707/100 |
| 2003/0005418 | A1* | 1/2003 | Sridhar et al. | 717/140 |
| 2003/0037263 | A1 | 2/2003 | Kamat et al. | 726/14 |
| 2003/0061504 | A1* | 3/2003 | Sprigg et al. | 713/200 |
| 2005/0132379 | A1* | 6/2005 | Sankaran et al. | 718/105 |

FOREIGN PATENT DOCUMENTS

| JP | 4321143 A2 | 3/1991 |
|---|---|---|
| WO | WO 03/021467 | * 3/2003 |

OTHER PUBLICATIONS

Ranjith Purush, Using Windows System Resource Manager for Server Consolidation, Dell, May 2003, pp. 1-14.*

(Continued)

Primary Examiner—Apu Mofiz
Assistant Examiner—Brent Stace
(74) Attorney, Agent, or Firm—Konrad Raynes & Victor LLP; David W. Victor (57) ABSTRACT

Provided are a method, system, and program for allocating resources for computational resources. A request is received to modify a permitted resource allocation. A determination is made of a modification restriction providing a limit on modifications that may be made to permitted resource allocations and the requested modification to the permitted resource allocation is allowed if the determined modification restriction allows the requested modification.

24 Claims, 4 Drawing Sheets

OTHER PUBLICATIONS

Informix Online Documentation. *Document Notes for Informix Guide to SQL: Syntax*, Jan. 9, 2001, *Version 8.31* [online] Available from http://www-306.ibm.com/software/data/informix/pubs/library/83eds/83docnotes/SQLSDOC.html.

*IBM Informix Guide to SQL: Syntax.* IBM Informix Extended Parallel Server, Version 8.4; IBM Informix Dynamic Server, Version 9.3. Aug. 2002., Part No. 000-9100, Title and Copyright (pp. i-ii)), Table of Contents (pp. iii-viii), and pp. 2-647-2-648; 2-649; and 2-662-2-666. Available from http://publibfi.boulder.ibm.com/epubs/pdf/9100.pdf.

*Privleges Proved by MySQL.* My SQL Reference Manual, Section 4.2.7, 2 pages. Retrieved on Feb. 24, 2004 [online]. Available from http://my.sql.progen.com.tr/doc/en/Privileges_provided.html.

*Oracle9i SQL Reference*, Release 2 (9.2), Part No. A96540-02. "Listing of System and Object Privileges," Mar. 2002. Title and Copyright (pp. i-ii)), Table of Contents (iii-xvi); Preface (xvii-xxxvi); Introduction (1-1 to 1-6); and pp. 17-29 to 17-52.

*Oracle9i SQL Reference*, Release 2 (9.2), Part No. A96540-01. "Listing of System and Object Privileges," Mar. 2002. Title and Copyright (pp. i-ii)), Table of Contents (iii-xvi); and pp. 17-36 to 17-50.

\* cited by examiner

METHOD, SYSTEM, AND PROGRAM FOR RESTRICTING MODIFICATIONS TO ALLOCATIONS OF COMPUTATIONAL RESOURCES

BACKGROUND OF THE INVENTION

1. Field of the Invention

The present invention relates to a method, system, and program for restricting modifications to allocations of computational resources.

2. Description of the Related Art

In a distributed database environment, database clients submit Structured Query Language (SQL) application programs to a database server to execute against a database. The database server may execute the SQL program and, in certain cases, update the database or return data to the client. In current systems, database administrators can set the level of privileges different client users may have to access different sections of data in the databases.

In a distributed database environment, many database clients may contend for the database server computing resources, such as the database server memory, processor cycles, processor threads, etc. A database administrator may set limits on the amount of computational resources a particular user may consume, thereby restricting the amount of memory, processor cycles, etc. of the database server that may be allocated to execute the user's SQL application. However, in certain database environments, a user may override any administrator computational resource restriction settings in the SQL application. This limits the ability of the database administrator to maintain and manage the allocation of database server computational resources to ensure quality of service to the different users accessing the database.

BRIEF DESCRIPTION OF THE DRAWINGS

Referring now to the drawings in which like reference numbers represent corresponding parts throughout.

SUMMARY

Provided are a method, system, and program for allocating resources for computational resources. A request is received to modify a permitted resource allocation. A determination is made of a modification restriction providing a limit on modifications that may be made to permitted resource allocations and the requested modification to the permitted resource allocation is allowed if the determined modification restriction allows the requested modification.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
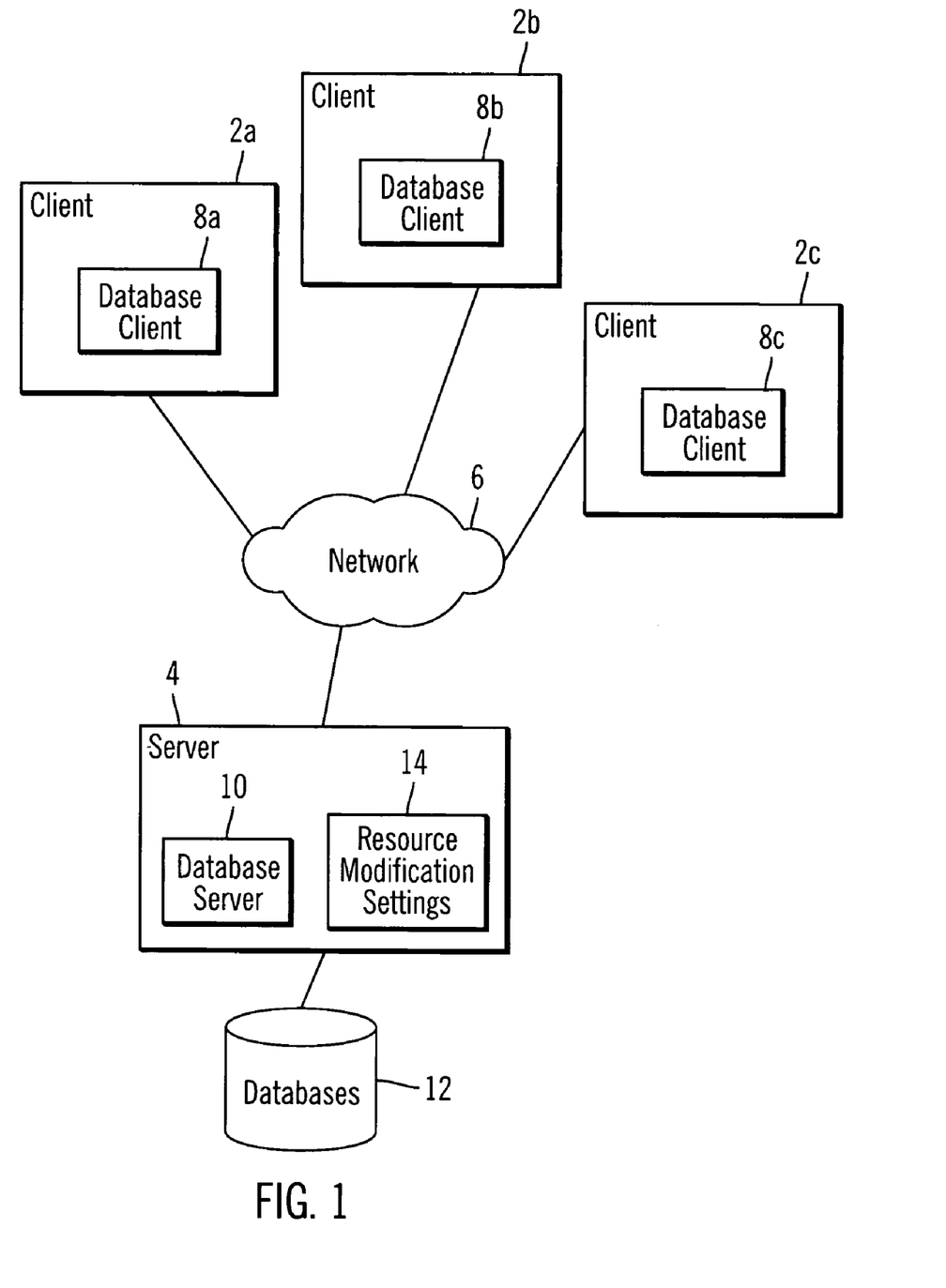
FIG. 1 illustrates a computing environment in which embodiments of the invention are implemented.

FIG. 1 illustrates a distributed database environment in which embodiments of the invention are implemented. A plurality of client systems 2a, 2b, 2c communicate with a server 4 over a network 6. The client systems 2a, 2b, 2c each include a database client program 8a, 8b, 8c capable of submitting database requests to a database server program 10 executing in the server 4 to access data in the databases 12. The client database program 8a, 8b, 8c may submit database requests within SQL applications, through separately transmitted instructions, and/or via stored procedure calls, as described below. The requests may comprise database queries, read, and write requests, or any other type of operation request known in the art requiring computational resources, such as memory, processor resources, etc.

The server 4 further maintains resource modification settings 14 that specify whether a resource allocation of the computational resources is mutable, i.e., may be changed, and the maximum allocation of resources permitted by a user or for a database and further whether the user may change the maximum allocation. These limitations on how resource allocation settings may be modified allow the administrator to limit the amount of resources used by any one query to efficiently allocate resource among different users and queries. These restrictions may apply to specific users, a group of users or to a database that is subjected to the requested query.

The database client 8a, 8b, 8c and server 10 programs may comprise database client/server applications known in the art, such as the International Business Machines Corporation ("IBM") DB2® database product or other database programs. (DB2 is a registered trademark of IBM). The clients 2a, 2b, 2c may comprise any computational device known in the art, such as a workstation, desktop, laptop, hand held device, telephony device, server, etc., and the server 4 may comprise a server class machine. The database 12 may include tables and indexes implemented in a storage media. The network 6 may comprise a Local Area Network (LAN), Wide Area Network (WAN), Storage Area Network (SAN), the Internet, an Intranet, a wireless network, etc.

Figure 2:
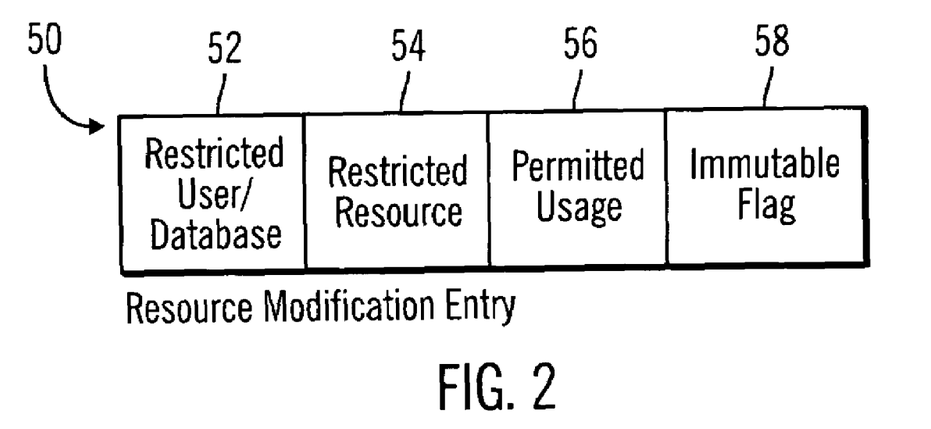
FIG. 2 illustrates a format of a resource limitation setting in accordance with embodiments of the invention.

FIG. 2 illustrates details of the format for an entry 50 in the resource limitation settings 14, which includes:

Restricted Database 52: identifies the database to which the request is submitted to which the resource modification restriction applies. Restrictions may also apply to users.

Restricted Resource 54: identifies the server 4 computational resource that is subject to the modification restriction, such as memory, processors used, threads allowed, type of table that may be created, location in which a table or other data structure may be created, etc.

Permitted Usage 56: indicates the maximum allowed amount of the resource that may be allocated to one user/database or some other restriction on the resource subject to the limitation. If there is no specific value set by the administrator or user, then the permitted usage will comprise a default value provided by the system.

Immutability flag 58: flag indicating whether the user may change the permitted usage for the restricted resource, e.g., "on" indicates the user may not change the permitted usage 56 and "off" means the user may change the permitted usage 56. This flag provides the administrator control over whether users may alter the limitations the administrator sets on modifications of resource allocations to insure quality of service among different users.

There may be multiple entries 50 for each user/database, where each entry specifies the resource limitation for one specific resource. Below are some examples of restricted resources and permitted usages.

Relative Memory Usage: specifies the relative amount or a value of memory resources that may be allocated to a query request. A query can request a percentage of memory or a minimum and maximum range of memory. The administrator may indicate through the relative memory usage the maximum percentage of memory resources, e.g., bytes, pages, etc., that can be allocated to a query to determine the amount of memory that the query actually is allocated. The relative memory comprises an amount of the absolute resources available for allocation at the server 4.

Computational Quota: indicates the number of processors or threads that may be allocated to process a query. Allowing the allocation of multiple processors or threads to a query may allow parallelization and faster execution of the query.

Max Scan: indicates the number of threads that may be used to scan a table or index. This determines the amount of parallelism imparted on scanning the table, i.e., fewer allocated scan threads, lesser the parallelism.

Tablespace Location: if specified, may provide a default storage location, i.e., logical volume, area in storage, etc., in which tablespaces may be created. This restricts the user to creating tablespaces in the specified location only, unless this restriction is specified to be mutable.

Table Types: may restrict the types of tables a user may create within the database. For instance, the table type value may indicate that the user may only create non-logging tables.

Figure 3:
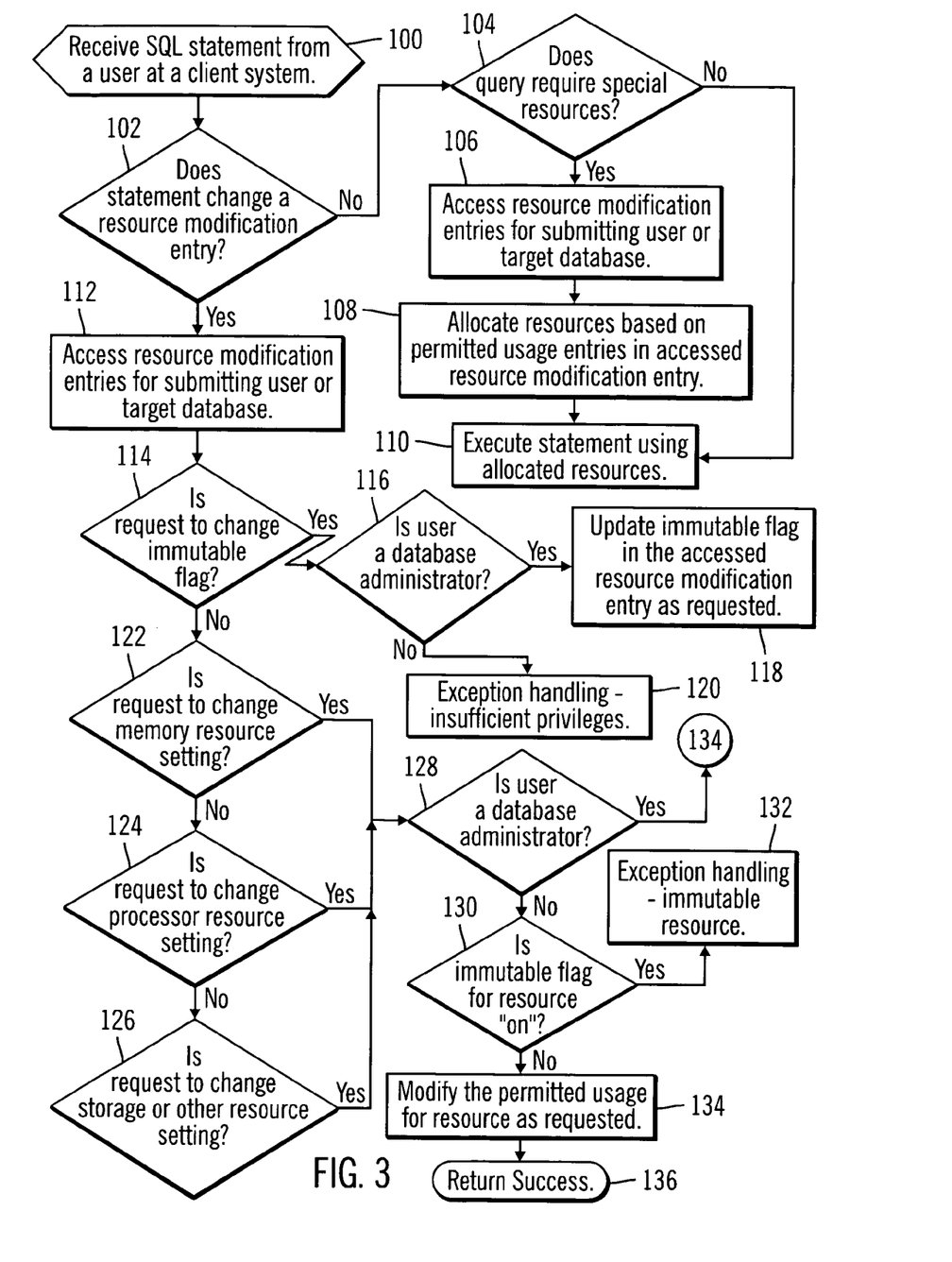
FIG. 3 illustrates operations performed to process a query in accordance with embodiments of the invention.

FIG. 3 illustrates operations performed by the database server 10 to process queries, which may be in the form of an SQL application or other code that specifies an action to perform with respect to the databases 12, such as read, write, search, etc. One type of query or command may specify to modify resource allocation parameters in the resource modification entries 50, such as change the mutability (immutable flag 58) or set the limits or values for the resource parameters. Another type of query is a query to manipulate or access data in the database 12. These types of queries typically occur in separate SQL statements, where a change to the resource allocation parameters will affect queries accessing and manipulating the data in the database 12. Upon receiving (at block 100) an SQL statement, if (at block 102) the statement does not change a resource modification entry 50, or the permitted usage 56 for a resource allocation, and does not require special resources (at block 104), then the database server 10 executes (at block 110) the statement using currently allocated resources. If (at block 104) the statement does request additional computational resources, then the resource modification entries 50 for the submitting user or target database 12 are accessed (at block 106) and the resources allocated (at block 108) based on the permitted usage 56 (FIG. 2) in the accessed resource modification entries 50. Control then proceeds to block 110 to execute the statement using the allocated resources.

In executing the statement using the allocated resources, if relative memory usage is specified, then the database server 10 will allocate the specified memory in the permitted usage 56 to the request. If the permitted usage 56 concerns processor resources, such as a computational quota or max scan, then the specified processor resources in the permitted usage 56, e.g., processors or threads, will be allocated. If the permitted usage 56 indicates a tablespace location, then the table will be created at the location identified in the permitted usage 56 or if the permitted usage 56 indicates a table type, then any table being created will be of the type specified in the permitted usage 56.

If (at block 102) the statement does change a resource modification entry 50, then the resource modification entries 50 for the submitting user or target database 12 are accessed (at block 112). If (at block 114) the modification request is to change an immutable flag 58 and if (at block 116) the user requesting the change is a database administrator, then the immutable flag 58 in the accessed resource modification entry 50 is updated (at block 118) as requested. Otherwise, if (at block 116) the user requesting the change is not an administrator, then an exception is thrown (at block 120) for insufficient privileges.

If the modification request is for a change to the relative memory resource settings (at block 122), a request to change a processor resource setting (at block 124), such as the computational quota or max scan, or a request to change storage, such as the tablespace location, or some other resource, such as the table type, (at block 126), then a determination is made (at block 128) if the user is an administrator. If (at block 128) the user is an administrator, then the permitted usage 56 for the restricted resource 54, e.g., relative memory, processor resource, storage, etc., is modified (at block 134) as requested. Otherwise, if (at block 128) the user is not an administrator and if (at block 132) the immutable flag 58 for the restricted resource 54 and user 52 does not indicate immutable, e.g., the immutable flag 58 is "off", then control proceeds to block 134 to allow the modification and return success (at block 136). Otherwise, if the immutable flag 58 indicates that the resource restrictions are immutable, e.g., the flag 58 is "on", then an exception is thrown (at block 132) indicating an immutable resource.

In certain embodiments, the resource modification settings 14 may be maintained in a separate file accessible to the database server 10, such as a database table or any other file type or data structure.

In alternative embodiments, the database clients 8a, 8b, 8c may perform database related operations using a stored procedure database program structure. A stored procedure is a block of procedural constructs and embedded SQL statements, i.e., an application program, that is stored in a database, e.g., database 12, and can be called by name. Stored procedures allow an application program to execute in two parts. One part runs on the client and the other on the server. This allows one database client 8a, 8b, 8c call to produce several accesses of the database from the application program executing on the system, i.e., server including the database. Stored procedures are particularly useful to process a large number of database records, e.g., millions to billions of records, without having to transfer data between the server 4 and clients 2a, 2b, 2c. The client stored procedure passes input information to the server stored procedure which then, executing within the database server 10, processes numerous database 12 records according to such client input information. Further details of stored procedures are described in the publication "A Complete Guide to DB2 Universal Database," by Don Chamberlin (1998), which publications are incorporated herein by reference in its entirety.

In embodiments where the database clients 8a, 8b, 8c invoke stored procedures executed by the database server 10 against the database 12, the resource modification settings 14 may be included within the stored procedure, such that different resource modification settings may apply within different stored procedures.

ADDITIONAL EMBODIMENT DETAILS

The embodiments described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In the described embodiments, the resource modification settings applied to database clients invoking a database server to run applications or stored procedures. In alternative, embodiments, the resource modification settings and checking may be used in any other type of computing environment where different users want to execute operations requiring the sharing of resources. In such additional embodiments, the server to which the requests are directed would use the resource modification settings to control how resources are allocated to the user requests. In described embodiments, different data sets may provide component files in different programming languages, e.g., COBOL, PLI, etc., languages.

Described embodiments discussed limiting the amount of memory, processor, threads, etc. allocated to a user request and limiting the ability to modify such allocations. In alternative embodiments, different types of computational resources may be subject to the modification limitations maintained in the resource modifications limitation settings.

FIG. 3 describes specific operations occurring in a particular order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

Figure 4:
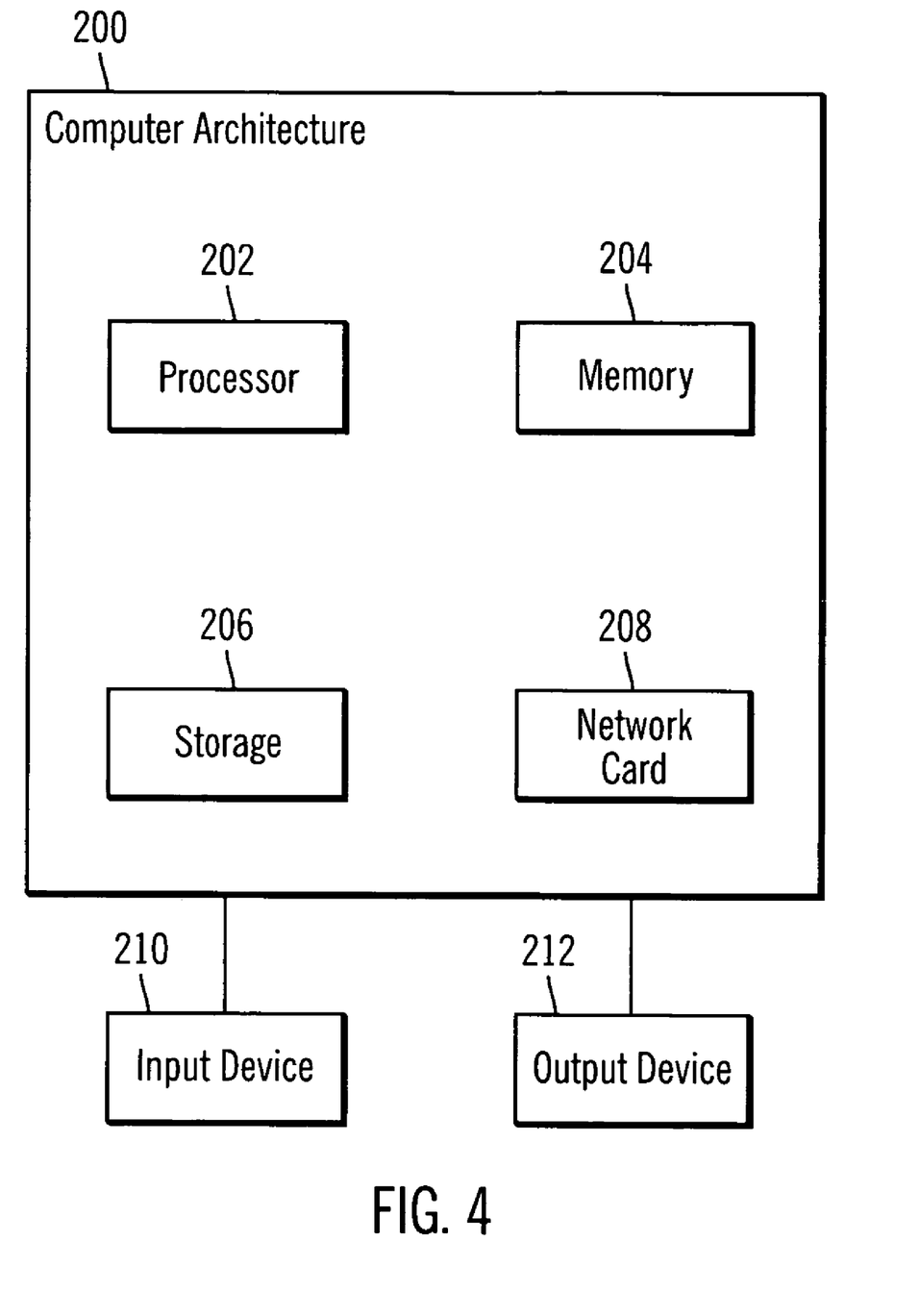
FIG. 4 illustrates a computing architecture that may be used to implement the computing environment described with respect to FIG. 1.

FIG. 4 illustrates one implementation of a computer architecture 200 of the host system 2 shown in FIG. 1. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method, comprising:
   receiving a request to modify a permitted resource allocation, wherein the permitted resource allocation indicates a type limitation on the type of data structures created for user computational requests;
   determining a modification restriction providing a limit on modifications made to the type limitation on the type of data structures that are created;
   allowing the requested modification of the type of data structures that are created to the permitted resource allocation in response to the determined modification restriction allowing the requested modification; and
   using the permitted resource allocation to allocate resources to user computational requests.

2. The method of claim 1, wherein the determination of the modification restriction comprises determining whether there is one modification restriction for the resource allocation to be modified for a user that initiated the request or for a database to which the resource allocation applies.

3. The method of claim 1, further comprising:
   generating an error condition in response to the requested modification not being permitted by the modification restriction.

4. The method of claim 1, wherein the permitted resource allocation comprises an amount of memory or an amount of processor resources to use when processing the operation, and wherein the requested modification of the amount of memory or processor resources to use is permitted if the modification restriction indicates that the permitted resource allocation can be modified.

5. The method of claim 1, wherein the permitted resource allocation indicates a location where data structures are created, and wherein the requested modification of the location where data structures are created is permitted if the modification restriction indicates that the permitted resource allocation can be modified.

6. The method of claim 1, further comprising:
receiving a request to modify one modification restriction for one permitted resource allocation;
modifying the modification restriction as requested if the request is submitted by an administrator; and
denying the requested modification of the modification restriction if the request is not submitted by the administrator.

7. The method of claim 1, wherein the modification restriction comprises an immutable indicator indicating whether the modification restriction can be modified by someone other than the administrator.

8. The method of claim 1, wherein the modification restriction is maintained in a stored procedure program, and wherein the permitted resource allocations specify resource allocations to execute the stored procedure program in which the modification restrictions are maintained.

9. A system comprising:
computational resources;
circuitry capable of causing operations to be performed, the operations comprising:
(i) receiving a request to modify a permitted resource allocation, wherein the permitted resource allocation indicates a type limitation of the type of data structures created for user computational requests;
(ii) determining a modification restriction providing a limit on modifications made to the type limitation of the type of data structures that are created;
(iii) allowing the requested modification of the type of data structures that are created to the permitted resource allocation in response to the determined modification restriction allowing the requested modification; and
(iv) using the permitted resource allocation to allocate resources to user computational requests.

10. The system of claim 9, wherein the determination of the modification restriction comprises determining whether there is one modification restriction for the resource allocation to be modified for a user that initiated the request or for a database to which the resource allocation applies.

11. The system of claim 9, wherein the operations capable of being performed by the circuitry further comprise:
generating an error condition if the requested modification is not permitted by the modification restriction.

12. The system of claim 9, wherein the operations capable of being performed by the circuitry further comprise:
generating an error condition in response to the requested modification not being permitted by the modification restriction.

13. The system of claim 9, wherein the permitted resource allocation indicates a location where data structures are created, and wherein the requested modification of the location where data structures are created is permitted if the modification restriction indicates that the permitted resource allocation can be modified.

14. The system of claim 9, wherein the operations capable of being performed by the circuitry further comprise:
receiving a request to modify one modification restriction for one permitted resource allocation;
modifying the modification restriction as requested if the request is submitted by an administrator; and
denying the requested modification of the modification restriction if the request is not submitted by the administrator.

15. The system of claim 9, wherein the modification restriction comprises an immutable indicator indicating whether the modification restriction can be modified by someone other than the administrator.

16. The system of claim 9, wherein the modification restriction is maintained in a stored procedure program, and wherein the permitted resource allocations specify resource allocations to execute the stored procedure program in which the modification restrictions are maintained.

17. An article of manufacture capable of causing operations to be performed, the operations comprising:
receiving a request to modify a permitted resource allocation, wherein the permitted resource allocation indicates a type limitation on the type of data structures created for user computational requests;
determining a modification restriction providing a limit on modifications made to the type limitation on the type of data structures that are created;
allowing the requested modification of the type of data structures that are created to the permitted resource allocation in response to the determined modification restriction allowing the requested modification; and
using the permitted resource allocation to allocate resources.

18. The article of manufacture of claim 17, wherein the determination of the modification restriction comprises determining whether there is one modification restriction for the resource allocation to be modified for a user that initiated the request or for a database to which the resource allocation applies.

19. The article of manufacture of claim 17, wherein the operations further comprise:
generating an error condition in response to the requested modification not being permitted by the modification restriction.

20. The article of manufacture of claim 17, wherein the permitted resource allocation comprises an amount of memory or an amount of processor resources to use when processing the operation, and wherein the requested modification of the amount of memory or processor resources to use is permitted if the modification restriction indicates that the permitted resource allocation can be modified.

21. The article of manufacture of claim 17, wherein the permitted resource allocation indicates a location where data structures are created, and wherein the requested modification of the location where data structures are created is permitted if the modification restriction indicates that the permitted resource allocation can be modified.

22. The article of manufacture of claim 17, wherein the operations further comprise:
receiving a request to modify one modification restriction for one permitted resource allocation;
modifying the modification restriction as requested if the request is submitted by an administrator; and
denying the requested modification of the modification restriction if the request is not submitted by the administrator.

23. The article of manufacture of claim 17, wherein the modification restriction comprises an immutable indicator indicating whether the modification restriction can be modified by someone other than the administrator.

24. The article of manufacture of claim 17, wherein the modification restriction is maintained in a stored procedure program, and wherein the permitted resource allocations specify resource allocations to execute the stored procedure program in which the modification restrictions are maintained.

* * * * *